Sept. 20, 1932.   F. RAISBECK   1,877,966
FERTILIZER DISTRIBUTOR
Filed Nov. 23, 1928   2 Sheets-Sheet 1

Witness
A. D. McLeay

Inventor
Frank Raisbeck
By Brown, Jackson, Boettcher & Dienner
Attorneys

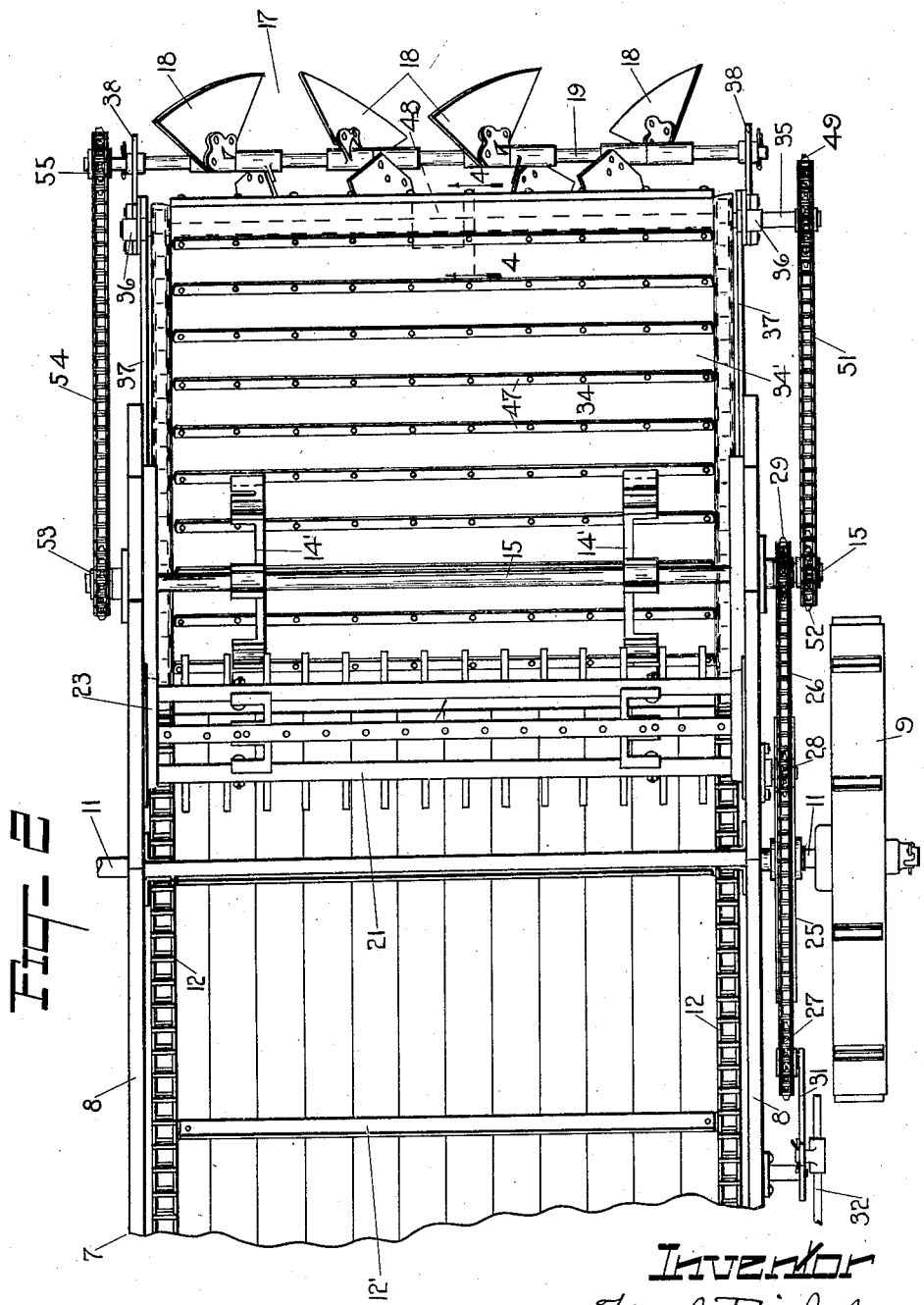

Patented Sept. 20, 1932

1,877,966

UNITED STATES PATENT OFFICE

FRANK RAISBECK, OF MOLINE, ILLINOIS, ASSIGNOR TO DEERE & COMPANY, OF MOLINE, ILLINOIS, A CORPORATION OF ILLINOIS

FERTILIZER DISTRIBUTOR

Application filed November 23, 1928. Serial No. 321,298.

The present invention relates generally to fertilizer distributors and has particular reference to the provision of improved attachments for converting the ordinary manure spreader into a fertilizer distributor for spreading lime and other pulverulent fertilizers.

The primary object of the invention is to provide an improved construction and arrangement of attachments by which a conventional type of manure spreader can be readily converted into a distributor for spreading lime and like fertilizers with minimum inconvenience and without the necessity of making extensive changes in the arrangement and assembly of the ordinary operating parts of the manure spreader.

Another object of the invention is to thus provide in the resulting fertilizer distributor a construction wherein the lime or other fertilizer is carried up to a point above the usual wide spreading device and is dropped upon this wide spreading device for an effective dispersion of the fertilizer from the rear end of the implement.

Other objects and advantages will appear in the following description of a preferred embodiment of the invention. In the accompanying drawings illustrating such embodiment:

Fig. 2 is a plan view of this portion of the implement;

Figure 1:
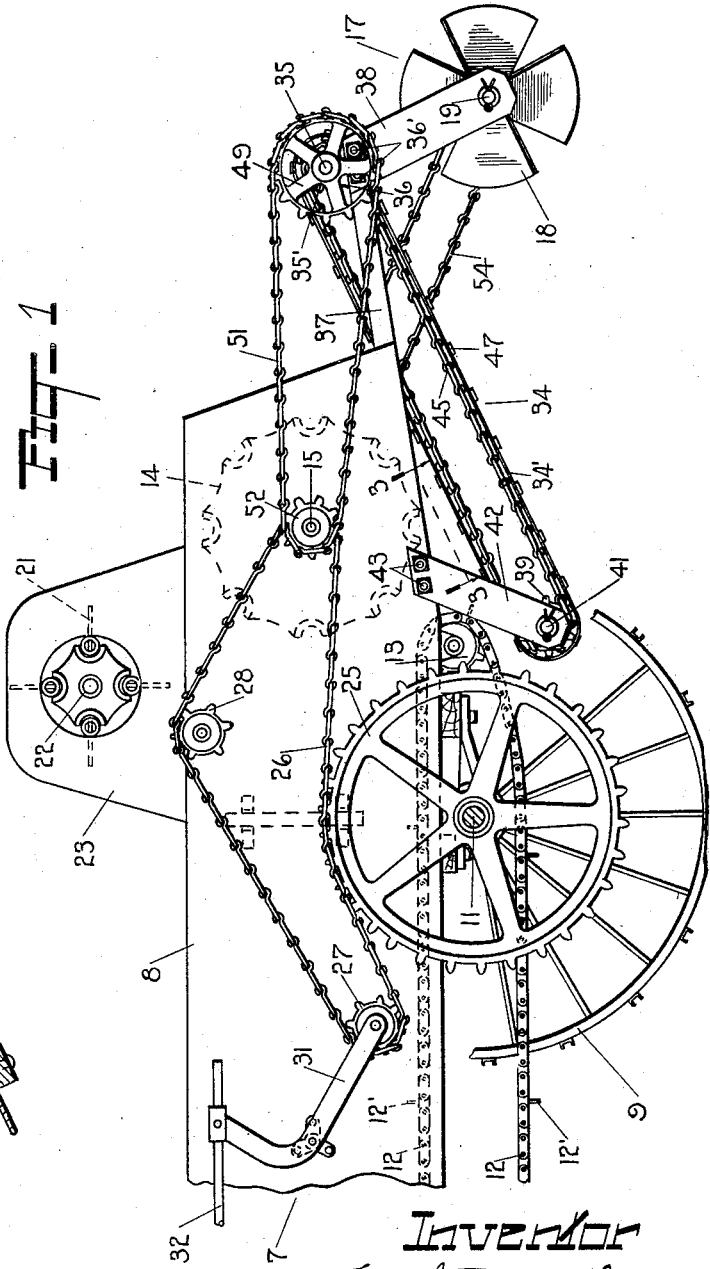
Fig. 1 is a fragmentary side elevational view of the rear portion of a typical manure spreader, showing the application of the present invention thereto, the adjacent rear traction wheel being removed to avoid obscuring the illustration.

The conventional type of manure spreader illustrated in Figs. 1 and 2 comprises a bed 7 defined between the two side walls 8, and in which bed the load of fertilizer is carried. The rear end of the vehicle is usually supported on traction wheels 9 which, in the construction shown, are mounted on an axle 11 which supports the rear end of the bed 7. Traveling lengthwise in the bottom of the bed is the usual feeding apron 12 comprising spaced cross slats or bars 12' which serve to feed the load of fertilizer along the bottom of the bed towards the rear end of the vehicle. The connecting links of the feeding apron pass downwardly around sprocket wheels 13 mounted adjacent to the rear end of the bed and thence pass forwardly under the bed to similar sprocket wheels at the front end of the bed. A slow feeding motion is imparted to the apron 12 in the forward travel of the vehicle, such feeding motion being usually derived from the traction power of one of the wheels 9 through mechanism which is well known and which, therefore, need not be described.

Mounted between the side walls 8 approximately at the rear end of the implement is a relatively large beater wheel 14 which is supported on a shaft 15 extending outwardly through both side walls 8. In the conventional construction this beater wheel comprises two laterally spaced spiders or end heads 14' best illustrated in Figure 2, between which extend longitudinal beater bars having spaced teeth projecting therefrom. In adapting the implement to the spreading of lime and like fertilizers, these beater bars are preferably removed, their mounting on the spiders or end heads being such as to permit of their easy removal. When such bars are on the beater cylinder 14 in the manure spreading use of the implement, the teeth projecting from said bars rotate upwardly against the load of manure which is slowly presented to the beater wheel, and throw portions of the manure upwardly and rearwardly for dropping down upon a rotary wide-spreading device 17 which is mounted in rear of the beater wheel 14. Such wide-spreading device usually comprises a suitable arrangement of paddles or blades 18 mounted on a transversely extending rotary shaft 19, and functioning to throw a considerable part of the fertilizing material laterally, so that the fertilizer is spread in a fan-shape dispersion from the rear end of the implement.

The ordinary manure spreader also usually comprises a rotary retarder 21 which extends transversely of the bed and is disposed above and forwardly of the beater wheel 14. The shaft 22 on which this retarder is mounted is usually supported in upwardly projecting extensions 23 rising from the side walls 8 of the bed. Such rotary retarder is provided for cooperating with the beater wheel 14 in securing the most effective distribution of the fertilizer, in a manner well known.

The beater wheels 14 and 21 and the widespreading device 17 are usually driven from the traction power of one or both traction wheels 9 through a large sprocket wheel 25 mounted on the axle 11 at one side of the bed and operatively connected with one or both wheels. Adapted to engage with this sprocket wheel is a main drive chain 26 which passes forwardly around a shiftable idler sprocket wheel 27, thence upwardly over an upper sprocket wheel 28 mounted on the bed, and thence rearwardly around a sprocket wheel 29 which is mounted on the projecting end of the beater shaft 15. The forward idler sprocket 27 is mounted on a swinging arm 31 pivoted to the side of the bed and operatively connected through a rod 32 extending forwardly to an operating lever mounted adjacent to the driver's seat at the front end of the implement, whereby the lever 31 and idler sprocket 27 can be swung upwardly or downwardly for carrying the drive chain 26 into and out of engagement with the large sprocket wheel 25 for starting and stopping the rotation of the beater wheels and wide spreading device.

In converting the manure spreader into a lime spreader, I mount an endless conveyor 34 upon the implement in such position as to receive the lime from the rear end of the feeding apron 12 and to convey the same rearwardly and upwardly to an elevated point above the widespreading device 17 for dropping the lime down upon this widespreading device. By this arrangement practically the entire quantity of lime distributed is subjected directly to the scattering action of the widespreading device. The discharge end of the conveyor 34 passes around sprocket wheels 35' mounted on a transversely extending shaft 35. In the arrangement shown, such shaft is supported adjacent to its ends in bearings 36 which are supported on arms 37 projecting rearwardly from the side walls 8 of the bed. In such arrangement, supporting arms 38 in the form of attachments are bolted to the rearwardly projecting arms 37, the attachment arms 38 extending downwardly and slightly rearwardly to provide bearing supports for the wide spreader shaft 19, with the two shaft axes 19 and 35 positioned to have the widespreading device exert the most effective dispersion on the lime dropping from the end of the conveyor 34.

The lower forward end of the conveyor 34 passes around sprocket wheels 39 mounted upon a transverse shaft 41. The ends of this shaft having bearing support in attachment arms or brackets 42 which are secured to the side walls of the bed by bolts 43, the shaft 41 being positioned by these arms to dispose the receiving end of the conveyor 34 well under the end of the feeding apron 12 so as to receive all of the lime dropping off the end of the apron.

Figure 3:
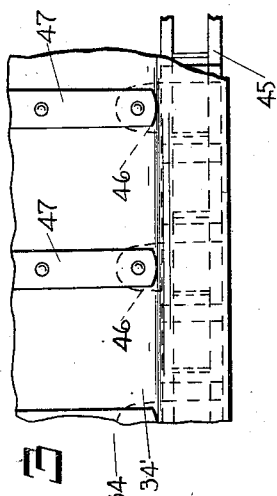
Fig. 3 is a fragmentary plan view of one edge of the rear conveyor, corresponding to a section taken on the plane of the line 3—3 of Fig. 1.
Figure 4:
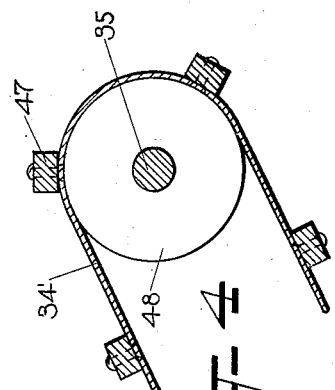
Fig. 4 is a sectional view through this conveyor, taken on the plane of the line 4—4 of Fig. 2 where the conveyor is passing around sprocket wheels or rollers on its rear drive shaft.

The conveyor 34 is of the belt type comprising a solid flexible surface 34' of fabric or the like extending from side to side of the conveyor (Fig. 3). Extending under each edge of the conveyor surface 34' is a chain 45 which passes over the sprocket wheels 35' and 39. Lugs 46 project inwardly from the links of the chain, and riveted or otherwise secured to these lugs are transverse feeding slats or ribs 47 which are disposed on the outer side of the conveyor surface 34', such surface being also secured to the slats 47. If desired, the two conveyor shafts 35 and 41 may be provided with rollers or pulleys 48 (Fig. 4) for supporting the intermediate portions of the conveyor between the side chains 45.

The upper conveyor shaft 35 preferably constitutes the driving shaft, and has a sprocket wheel 49 secured to the end thereof. A chain 51 passes around this sprocket wheel and around a sprocket pinion 52 which is mounted on the beater shaft 15, whereby the conveyor is driven from the large traction driven sprocket wheel 25. At the other side of the implement, the beater shaft 15 is provided with another sprocket pinion 53 around which passes a drive chain 54. Such chain extends rearwardly and passes around a sprocket wheel 55 mounted on the projecting end of the widespreader shaft 19, whereby this widespreading device is also driven from the beater cylinder 14.

When the implement is being used to spread manure, the widespreading device 17 is mounted above the arms 37 with its shaft 19 supported in the bearings 36 or in like bearings in the position shown as being occupied by the shaft 35. In converting the implement to the spreading of lime, the shaft 35 with its conveyor driving wheels is substituted in the bearings 36 for the widespreading device, and the depending arms 38 are bolted to the arms 37 for supporting the widespreading device at the lower point illustrated. By such arrangement the lime is carried upwardly in a path below the beater cylinder 14 for discharge above the widespreading device 17, thereby avoiding the necessity of removing the beater cylinder in its entirety. The desirability or necessity of removing the longitudinal tooth carrying bars from such wheel or cylinder is merely to prevent the teeth engaging in the lime and scattering the same before it is dropped upon the widespreading device. While the foregoing constitutes the preferred arrangement, the invention also contemplates converting the implement into a lime spreader without shifting the widespreading device 17 from its original axis. For example, two step conveying mechanisms may be employed for carrying the lime below the main beater cylinder 14 and raising the same to a higher point, or the beater cylinder 14 may be removed to permit the single conveyor 34 to be inclined upwardly at a sharper angle.

In securing the attachment arms 38 to the supporting arm structure 37, the same bolts 36' which secure the bearing brackets 36 to the arms 37 may also be employed to secure the attachment arms 38 to the arms 37. Likewise, the bolts 43 which secure the arms 42 to the bed may be body bolts for securing the parts of the bed together. Thus, the mounting of the attachment devices may be such as to involve no drilling or alteration of the original manure spreader design. The two sprocket wheels 52 and 53 at opposite ends of the beater shaft 15 are usually employed to drive the rotary widespreading device 17 and the upper rotary beater or retarder 21. When the implement is converted for use as a lime spreader, there is no occasion for rotating the upper beater wheel 21, and accordingly one of these sprocket wheels is employed for driving the secondary conveyor 34 and the other sprocket wheel is connected to drive the widespreading device 17.

Having thus described my invention, what I claim as new and desire to secure by Letters Patent is:

1. The combination with a manure spreader comprising a bed, a feeding apron therein and a widespreading device, of attachment means for adapting the implement to the spreading of lime and like fertilizers comprising a conveyor disposed substantially below said bed to receive the fertilizer from said feeding apron and to convey the same to a position over said widespreading device.

2. The combination with a manure spreader comprising a feeding apron and a widespreading device, of attachment means for adapting the implement to the spreading of lime and like fertilizers comprising an upwardly inclined endless conveyor including a continuous load supporting surface and having its lower end disposed below said feeding apron to receive the fertilizer from the discharge end thereof and to convey the same upwardly for dropping upon said widespreading device.

3. The combination with a manure spreader comprising a transverse axle, supporting wheels thereon, a feeding apron, a rotating beater disposed in rear of said transverse axle, and a rotary widespreading device, of attachment means for adapting the implement to the spreading of lime and like fertilizers comprising an endless belt conveyor having its forward portion disposed under the discharge end of said feeding apron and extending rearwardly below said rotary beater and having its rearward portion disposed substantially above said rotary widespreading device for dropping the fertilizer thereupon.

4. The combination with a manure spreader comprising a feeding apron and a widespreading device, of attachment means for adapting the implement to the spreading of lime and like fertilizers comprising a front conveyor wheel, means for supporting said wheel below the discharge end of said feeding apron, a rear conveyor wheel, means supporting said rear wheel above said widespreading device, and an endless belt conveyor passing around said wheels and conveying the fertilizer from said feeding apron to a discharge point above said widespreading device.

5. The combination with a manure spreader comprising a bed, a feeding device therein, supporting means at the rear end of said bed, and a rotary widespreading device adapted in the manure spreading use of the implement to be mounted on said supporting means, of attachment means for adapting the implement to the spreading of lime and like fertilizers comprising attachment supporting devices adapted to support said rotary widespreading device in a position below its normal position, and conveyor means adapted to receive the fertilizer from the discharge end of said feeding device and to convey the same to said rotary widespreading device.

6. The combination with a manure spreader comprising a bed, a feeding device operating therein, a rotary beater supported adjacent to the discharge end of said feeding device, supporting means at the rear end of said bed, and a rotary widespreading device comprising a transversely extending shaft adapted in the manure spreading use of the implement to be mounted on said supporting means, of attachment means for adapting the implement to the spreading of lime and like fertilizers comprising a front conveyor wheel, means for supporting said wheel below the discharge end of said feeding device, a rear conveyor wheel, means for mounting said rear wheel on said supporting means, an endless belt conveyor traveling around said wheels and adapted to convey the fertilizer discharged from the end of said feeding device rearwardly and upwardly below said beater, and attachment arms extending downwardly from said supporting means and adapted to support the transverse shaft of said rotary widespreading device with the latter disposed below the discharge end of said belt conveyor.

7. The combination with a manure spreader comprising a bed, a feeding device therein, and a widespreading device, of attachment means for adapting the implement to the spreading of lime and like fertilizers comprising a conveyor having a portion thereof disposed substantially below said feeding device to receive the fertilizer therefrom and to convey the same to a point above said widspreading device, and traction driven means connected with said conveyor for driving the latter.

8. The combination with a manure spreader comprising a bed, a feeding device traveling rearwardly in said bed, and a widespreading device comprising a transversely extending shaft and blade means thereon, of attachment means for adapting the implement to the spreading of lime and like fertilizers comprising conveying means including a continuous load supporting surface and having its receiving end disposed below the discharge end of said feeding device to receive the fertilizer therefrom and to convey the same rearwardly and upwardly to a discharge point above said widespreading device, and traction driven means for driving said conveying means and said widespreading device.

9. The combination with a manure spreader comprising a bed, a feeding apron traveling rearwardly in said bed, a rotary beater wheel disposed adjacent to the discharge end of said feeding apron, and a rotary wide spreading device comprising a horizontally extending shaft and spreader blades mounted thereon, of attachment means for adapting the implement to the spreading of lime and like fertilizers comprising attachment arms secured to said bed, front conveyor wheels mounted between said arms below the discharge end of said feeding apron, rear conveyor wheels mounted on the implement adjacent to the rear end thereof and above said front conveyor wheels, an endless belt conveyor passing around said wheels and conveying the fertilizer from the discharge end of said feeding apron rearwardly and upwardly below said beater wheel, and attachment arms secured to the rear portion of the implement and supporting the horizontal shaft of said widespreading device with the latter disposed below the discharge end of said conveyor.

10. The combination with a manure spreader comprising a bed, a feeding apron traveling rearwardly therein, a rotary beater wheel mounted adjacent to the discharge end of said feeding apron, a transverse shaft on which said beater wheel is supported, a traction driven sprocket wheel, a drive chain transmitting power from said sprocket wheel to said beater shaft, and a rotary widespreading device comprising a horizontally extending shaft having spreading blades mounted thereon, of attachment means for adapting the implement to the spreading of lime and like fertilizers comprising conveyor means mounted to receive the fertilizer from said feeding apron and to convey the same rearwardly and upwardly below said beater wheel, means for supporting said rotary widespreading device below the discharge end of said conveyor means, and driving chains operatively connected to drive said conveyor means and said rotary widespreading device from said beater shaft.

11. The combination with a manure spreader comprising a bed, a feeding apron traveling rearwardly therein, a beater wheel adjacent to the discharge end of said feeding apron, a transverse shaft on which said wheel is mounted, a traction driven sprocket wheel, chain drive means for transmitting power from said sprocket wheel to said beater shaft, a rotary widespreading device comprising a horizontally extending shaft having spreader blades mounted thereon, and supporting means at the rear end of the bed adapted in the manure spreading use of the implement to support the horizontal shaft of said widespreading device, of attachment means for adapting the implement to the spreading of lime and like fertilizers comprising arms secured to said bed and extending downwardly therefrom below the discharge end of said feeding apron, a transverse shaft extending between the lower ends of said arms, front conveyor wheels mounted on said shaft, a second transverse shaft carried by said supporting means, rear conveyor wheels mounted on said second transverse shaft, an endless belt conveyor passing around said conveyor wheels and conveying the fertilizer discharged from said apron rearwardly and upwardly beneath said beater wheel, attachment arms secured to the rear portion of the implement and extending downwardly, the horizontal shaft of said widespreading device being mounted between said latter attachment arms with the widespreading device disposed below the discharge end of said conveyor, and driving chains operatively connected to drive said conveyor and said rotary widespreading device from said beater shaft.

12. In a fertilizer distributor, the combination of a load carrying bed, a feeding device traveling rearwardly in the bottom of said bed, a widespreading device, and a conveyor having an imperforate surface, said conveyor having one end thereof disposed below said load carrying bed for conveying lime or like fertilizers from the discharge end of said feeding means to said widespreading device.

13. In a fertilizer distributor, the combination of a bed, a feeding device traveling rearwardly in the bottom of said bed, a rotary widespreading device comprising blade means extending transversely across the rear end of the implement, and conveyor means disposed with one end therof extending beneath said feeding device to receive the lime or other like fertilizer from the discharge end of said feeding device and to convey the same rearwardly and upwardly for dropping upon said widespreading device.

14. In a fertilizer distributor, the combination of a bed, a feeding apron traveling rearwardly in the bottom of said bed, a rotary beater wheel mounted adjacent to the discharge end of said feeding apron, a rotary widespreading device comprising blade means extending transversely of the implement at the rear end thereof, and conveyor means arranged to receive the lime or other like fertilizer discharged from between the rear end of said apron and said beater wheel and to convey the same rearwardly under said beater wheel to a discharge point above said rotary widespreading device.

15. In a fertilizer distributor, the combination of a bed, a traction wheel supporting said bed, a feeding apron traveling rearwardly in the bottom of said bed, a rotary beater wheel mounted adjacent to the discharge end of said feeding apron, a rotary widespreading device comprising blade means extending transversely of the implement adjacent to the rear end thereof, an endless belt conveyor disposed in inclined relation to receive the fertilizer discharged over the rear end of said feeding apron and between the beater wheel and the rear end of the apron and adapted to convey the same upwardly and rearwardly below said beater wheel for dropping upon said rotary widespreading device, said belt conveyor being substantially imperforate for conveying lime and other like fertilizers, and means for driving said beater wheel, said rotary widespreading device and said belt conveyor from said traction wheel.

16. In a fertilizer distributor having feeding means to feed material rearwardly to discharge the same, mechanism to drive the feeding means and a widespreading device to scatter the material discharged, the combination of detachable brackets adapted to be detachably secured to said distributor, an auxiliary conveyor carried by said brackets and in a position to receive the discharged material from the feeding means, a second set of detachable brackets adapted to receive the widespreading device, and means to drive the conveyor and widespreading device from the driving mechanism for the feeding means.

17. In a fertilizer distributor, the combination of a load carrying bed, a conveying device for conveying lime or like fertilizer thereon externally and rearwardly away from said bed, a widespreading device comprising a horizontal transverse shaft having blade means thereon, and means fixedly secured to said bed and extending rearwardly therefrom for supporting both the discharge end of said conveying device and said widespreading device, and positioning the latter substantially below the discharge end of the former.

18. In a fertilizer distributor having a bed, feeding means in said bed for delivering material therein toward the discharge end thereof, drive means for said feeding means, and a control mechanism connected with said drive means for interrupting the drive therethrough to said feeding means, the combination of attachment means for adapting the implement to the spreading of lime and the like, said attachment means including a widespreading device and a conveyor disposed in inclined relation with one end thereof below the discharge end of said feeding means and with its other end above said widespreading device, said conveyor being adapted to receive material dropped thereon from said feeding means and to deliver the material to said widespreading device, said drive means being connected with said conveyor, and said control mechanism for said feeding means controlling the drive to the conveyor of the attachment means.

19. An attachment for a manure spreader having a feeding apron therein and a widespreading device, said attachment comprising conveyor means, means for supporting said conveyor below said feeding apron to receive fertilizer discharged therefrom, and means for supporting said wide-spreading device below said conveyor means to receive and spread the fertilizer dropped thereon by said conveyor means.

In witness whereof, I hereunto subscribe my name this 13th day of November, 1928.

FRANK RAISBECK.